Patented Jan. 4, 1944

2,338,151

UNITED STATES PATENT OFFICE 2,338,151

CORN PROTEIN PRINTING INK AND INK BASE

Harry M. Weber, Chicago, Ill., assignor to American Maize-Products Company, New York, N. Y., a corporation of Maine No Drawing. Application February 17, 1941, Serial No. 379,290

15 Claims. (Cl. 106—24)

The present invention relates generally to protein printing inks and printing ink bases containing water in the vehicle, and in particular to those having corn protein as an essential ingredient of the vehicle, body or binder thereof.

The body of printing inks must be such that the ink compositions or ink bases are stable for long periods of time, and such that they do not alter chemically the pigments or colors used therein. The inks must be such that they apply readily and adhere well to paper. Applied ink coats are preferred which dry rapidly to a nontacky surface, thus avoiding off-setting. Dried ink coats which are water-resistant, non-bleeding, and non-smudging are also important objectives. Another important objective in compounding inks is to produce one which may be contacted with steam or heat to aid in setting the ink and in some cases to drive off more quickly volatile solvent ingredients.

Another major requirement in inks is that they must not dry to insoluble or non-dispersible products on the moving parts or type of the press or in other words must remain open. Heretofore, this requirement has been an obstacle in the use of proteins in inks. For example, in the practical use of some inks, such as news inks, they are worked over and over on a series of rolls, while exposed to the air, before they reach the impression type. Such inks must remain free or open, be non-skinning, and retain body and pigment during this period, yet provide when applied, a reasonably quick-drying ink.

I have found that corn protein has inherent properties which enables it to be compounded to provide a vehicle, body or binder for inks or ink bases to meet some or all of these desirable conditions. I have further found that corn protein may be compounded into inks suitable for news, rotogravure or planograph printing, and for absorption, heat and flash-dry application, to produce in all cases non-off-setting and smudgeproof copy, and when desired, non-bleeding and water-resistant copy.

Furthermore, I have found that corn protein may be compounded into inks of which the liquid vehicle may vary from an entirely aqueous one to a substantially non-aqueous one. Thus, corn protein may be utilized to form both low-cost inks, such as news inks, and relatively more expensive inks which fall within the price range of inks now in common use, such as the varnish-base and cellulose-derivative-base inks.

Corn protein is a product derived from corn in the manufacture of corn starch from corn grain. As secured in the corn refining industry it is termed gluten, and may be impure with adherent starch, fiber and corn oil. As ordinarily obtained, gluten runs 50% to 60% protein. When further purified by the removal of starch to form a starch-free product, it can be made to contain 70% to 80% protein, consisting of all the water-insoluble proteins of corn, including the prolamine zein, together with 8% to 10% of oily material, 4% to 6% fiber, 1% to 2% ash, and a residue of moisture. The full corn protein is roughly half zein, the remainder being a mixture of glutelin and globulin. Broadly, corn protein may be the protein product from which the alcohol soluble prolamine zein has been largely removed.

Zein is defined as the alcohol-soluble content, and it is soluble in a large number of organic solvents and mixtures, with and without water as a solvent ingredient. The other proteins are not likewise soluble in organic solvents. All the said proteins are dispersible in dilute solutions of the strong alkalis. The present invention contemplates viscous or liquid dispersions of corn protein, and the terms solution or dispersion are used interchangeably in the following description, except where differentiation is indicated.

Whether the ink compositions of the present invention are entirely aqueous or not, or have zein alone, or all or a part of the corn protein, the characteristics of the printed copy as to non-tackiness after initial drying, good adherence to paper, non-smudging, and when desired, non-bleeding and water-resistant, are essentially the same when they are applied and dried either by the absorptive capacity of the paper, as in news ink, or by the evaporative drying of the printed surface, as in rotogravure work, or by force drying by the use of a high degree of heat applied for a short period.

The ink bases or inks, may fall anywhere in the range of composition wherein the liquid vehicle is entirely water at one extreme, or substantially anhydrous at the other extreme. Examples within these ranges are given hereinafter, but it is first necessary to state that the methods of dispersing the corn protein may differ in these extremes. Thus, in the extreme case of all water, the dispersion of corn protein is effected by the action of alkaline solutions. In the other extreme, where complete dispersion may be effected in the absence of alkali, an organic solvent or mixed solvent for zein is employed and the protein for dispersion by solution must be the zein. However, in such case, if the non-zein protein content is present, it remains in a finely divided suspended form where it may function mechanically as filler. Such filler may be dyed with a suitable fast dye to act as a pigment. Again, where complete dispersion of the full corn protein is desired together with the effects resulting from zein dissolved in a solvent for zein, the presence of alkali in an aqueous zein solvent may be employed to effect complete dispersion.

Zein solutions

In my copending application, Serial No. 260,112, filed March 6, 1939, I have described the dissolving of zein in a zein solvent, such as 95% by volume ethyl alcohol, denatured or not, and further the dissolution of shellac, rosin or other resins and gums in such solution, with or without plasticizers for the mixed solid content, and the use of such as printing ink bases. In such cases the zeins may be dissolved in the heated resin to form a solid solution, and then the solid solution may be cut with a solvent. In my earlier application, Serial No. 247,367, filed December 23, 1938, which is a continuation in part of my earlier application, Serial No. 124,461, filed February 6, 1937, I describe the direct solution of the zein in a solvent for zein, and then the addition of shellac, or of a solution of shellac, and further disclose dissolving both zein and shellac together in a mutual solvent, in each case with or without plasticizer, to form a coating composition of a non-tacky character when initially dry. Such a composition may be employed as a printing ink base.

Zein may be dissolved in suitable solvents or mixtures of solvents, which are either more or less anhydrous than 95% ethyl alcohol. However, for economic reasons, in my preferred compositions, the full corn protein is used and it is to be understood that the zein component of it may be in solution in a zein solvent, while the non-zein component may be suspended as filler, or be dispersed in a conditioned acid, neutral or alkaline aqueous medium, which condition may be effected after the dispersion is originally accomplished by a suitable alkaline aqueous medium.

Alkali dispersion

The corn protein is difficult to disperse with alkali with avoidance of decomposition, as it requires solutions of pH of 11.0 or higher for complete dispersion. It is common to disperse it by use of 5% of its weight of caustic soda. Such strong alkali solutions of the proteins of a pH above 11.0 generally have a decomposing effect on corn protein and produce protein products which blacken and readily putrefy on storage of attempted ink bases produced therefrom. Therefore, dispersion is preferably effected by dispersing conditions which avoid pH values that lead to the formation of such degradation products or at pH values under 10.0.

The corn protein dispersions of my invention are further characterized by the fact that alkali dispersions may be reduced in pH to a pH below that necessary or used for effecting dispersion, and yet remain stable against precipitation of the protein. Accordingly, the preferred inks and ink bases having alkali-dispersed protein are formed by first effecting dispersion at a relatively higher pH and then reducing the pH to near neutral, or either just above or just below pH of 7. This has the distinct advantage that pigments, color, and other materials may be added to a near-neutral base, without danger of altering the added ingredients, such as changing the color of added pigmenting particles.

These properties of my corn protein dispersions are related to the ultimate ink coat. The ability of the deposited dried ink to withstand smudging is dependent upon the adherence of the ink to the sheet, and the internal binding properties of the printed ink. Bleeding of the ink is occasioned by the property of the dried ink to be redispersed when rubbed while wet or moist. Bleeding can be effected where the ink retains elements which impart to it a high alkaline dispersing pH to permit redispersion. It is a characteristic of the present corn protein ink compositions, that when applied they have a pH which is lower than the minimum dispersing pH of a simple caustic alkali solution. Good adherence and high binding power are effected by avoidance of conditions which permit the dispersed protein of the ink being precipitated to a non-gelatinous form in the applied ink prior to drying. This form might be induced by the normal acidity of unsized paper, coated paper, and sized paper. Corn protein dispersions produced by alkali-dispersion tend normally to precipitate at a pH which may be encountered in such papers. This is avoided in the present invention by employing dispersing agents that serve to buffer the ink to avoid such a precipitation during the period of application.

Another feature of the invention which may be optionally employed is the presence of a wetting or surface-active agent in the applied ink, which assures a more perfect union with a paper or like surface which receives the ink. This wetting agent may be added specially for such function, but it also may be added prior to dispersion as a wetting or as an acid to form a wetting agent which also facilitates dispersion, in accordance with the ideas set forth in my copending application, Serial No. 326,621, filed March 29, 1940, referring to dispersion of corn protein for sizing paper. A further feature of the invention is the formation of such a wetting agent as a product of neutralization by adding an appropriate acid, such as rosin, to reduce the pH of the alkaline solution having the high pH required to effect dispersion.

Inorganic as well as organic wetting agents may be employed. Suitable inorganic wetting agents are alkali-metal salts of the various acids of phosphorus, examples being sodium metaphosphate, and sodium pyrophosphate. They act also as buffers. When present such inorganic wetting agents are particularly active in increasing the adherence of the corn protein dispersions to solids in general, and as inks, to paper and coated papers, and other products to which ink is applied.

This above-mentioned undesired type of precipitation to a non-gelatinous form applies either to the inks under this invention which have alkali-dispersed protein, or to zein dispersed by solution in a zein solvent. In any case, however, whether or not there is zein solution in the ink composition, the presence of wetting agent in the ink increases adherence. The prevention of precipitation by the paper or other base to be printed, of alkali-dispersed protein in the ink, improves the binding of the ink together so that it dries in a solid matrix, as in the case where zein is deposited from its solution by evaporation of solvent.

The invention involves the preparation of ink bases into which pigment or filler is incorporated to make inks. Where solution of zein is present in the ink, the solvent may be chosen to give a wide variety of properties for applying inks under different conditions. Also the inks may be modified in many ways by mineral oils, vegetable oils, non-drying oils, drying oils, bitumens, fatty acids, waxes, resins, esters, ethers, plasticizers and agents which remain permanently in the ink, and the like. All of these materials are readily dispersible in the alkaline reacting solutions or dispersions of the proteins. Where zein solution is present in the ink, low-boiling and high-boiling solvents may be variously used to affect or predetermine the volatile character of the ink, for working it prior to application, and for drying it after application. Where steam or heat may be used to dry an applied ink, it may so alter the solvent as to destroy its solvent power, with the result that the ink is deposited. Although this may be referred to broadly as precipitation, it is to be distinguished from the precipitation to a non-gelatinous form as applied to solutions or alkali-dispersions of the protein.

Where corn protein containing corn oil or other added saponifiable oil is dispersed in alkali it may provide wetting agent by partial or complete saponification of the oil to form soap, which becomes active as a buffer in applied ink. Simultaneously with saponification of an oil, an amount of glycerine is formed which acts as a softening agent or plasticizer for the dried ink.

The following examples, wherein parts are given by weight, illustrate the invention.

Example 1

A hard tough solid solution is formed by mastication with heat from 40 parts by weight of zein and 35 parts of ester gum. Ester gum is a partially reacted product of glycerine (a polyhydric alcohol) and the abietic acid content of wood rosin, and is commonly referred to as a glyceride of abietic acid, the latter being a mono-basic organic acid. The ester gum of commerce has a measurable acid number, showing it to be an incompletely reacted ester. This solid composition makes an excellent printing ink base when cut with 400 to 700 parts 190 proof ethyl alcohol (grain or denatured), for intaglio printing. A distender may be used in making the solid solution. The distender may be a high-boiling solvent, such as the glycols and ethylene glycols or their esters, or a low-boiling volatile solvent, such as the monohydric alcohols, which soften the gum or the zein during the mastication. The solid product may be cut by 190 proof denatured alcohol, such as 5% methanol-denatured, to form stable solutions at 70° F.

Example 2

100 parts of commercial full corn protein containing 75% protein is added to 360 parts of water containing 5 parts of caustic soda, and heated to 165° F. The protein is thus dispersed at a pH of about 12.5. Then 20 parts of wood rosin are added, reducing the pH to 8.3, by forming sodium abietate. Carbon black pigment in the amount from 100 to 180 parts is milled into the dispersion, with addition of water of about 260 to 550 parts to make a liquid dispersion. Used as an ink on paper this provides a smudge-proof printed surface. Such a composition is subject to putrefaction if stored for too long a period (a week to 10 days at room temperature) owing to the adverse action of the strong dispersing alkali solution on the protein. Where oil is present in the protein, soap is present as well as glycerine.

Example 3

500 parts of zein and 100 parts of rosin are suspended in a slurry of 1500 parts of water, and 23 parts of caustic soda. The mixture is slowly heated to 185° F. This action completely saponified the rosin and dispersed the protein to a mass gelatinous at room temprature with a pH of 8.9. Then by adding 50 parts of rosin—meanwhile maintaining the temperature of the mass at 185° F. and mechanically agitating, the protein remains dispersed in the resulting mass at pH 7.2. To this 1000 parts of carbon black is added, and diluted with water to the point where it can be applied by means of rolls and used as an ink.

Example 4

The product resulting from Example 3 is not suitable for use on all present-day presses as an ink, being too short for such a method of application. This is corrected by mixing in 9 parts of mineral oil to 10 parts of the solids of the base, prior to the neutralization step of adding the rosin in Example 3. This lengthens the resulting ink, giving it the characteristics of an ordinary mineral oil news ink, for which use it is satisfactory to give a smudge-proof and substantially non-bleeding printed surface.

Example 5

400 parts of full corn protein containing 75% protein, 800 parts of diethylene glycol and 600 parts of water, are mixed in a mechanical mixer. Then 1¾ parts of sodium peroxide is added to reduce the coloring material present in this product, and mixing is continued for 30 minutes. Then 14 parts of caustic soda are added and the mass heated to 150–160° F. to effect dispersion of the protein. The resulting mass has a pH of 8.3. This is an ink base, into which pigment or filler may be milled.

Example 6

For a "flash-dry" ink 50 parts of the dispersion of Example 5 is diluted with 20 parts of water. By adding 1 part of lauric acid the pH is reduced to 6.9. A color such as Milori blue B–1, 10.6 parts, is milled into the substantially neutral base. When printed on sized paper, and subjected for a short time of 0.01 to 0.002 minute to heat of 500–900° F., the ink is smudge-proof and bleed-proof to rubbing with a moistened cloth.

Example 7

For a rotogravure ink, 500 parts of full corn protein having 75% protein and 10% corn oil and fatty acids, 100 parts of rosin, 980 parts of isopropyl alcohol of 99% (by volume) strength, and 520 parts of water, are made into a slurry. 25 parts of caustic soda is added and the mixture heated to 155–160° F. or a temperature below the boiling point of the alcohol mixture. This saponifies the corn oil, fatty acids and the rosin, and completely disperses the protein. To this ink base are added 360 parts of color, such as Milori blue, 192 parts of Santicizer 8, 360 parts of 99% (by volume) isopropyl alcohol, and 120 parts of water, to produce an ink suitable for a rotogravure press. In some instances further dilution of the ink is desirable to adapt it to the press and for this purpose 70% (by weight) isopropyl alcohol is used.

Example 8

In the foregoing example, the pH of ink produced is about 8.5 to 8.9. This was reduced to a pH of 7.2 by neutralization with rosin to a pH of 7.2 before the addition of color, 360 parts of peacock blue, in order that the tint of this color should be unaffected.

Example 9

| | Parts by weight |
|---|---|
| Zein | 45 |
| Shellac | 20 |
| Dibutyl tartrate | 25–35 |
| Denatured alcohol | 260 |

The above forms a limpid solution suitable for a printing ink base. At 70° F. it is stable and non-gelling for a period sufficiently long to permit a reasonable time of storage before use.

Example 10

Full corn protein in the amount of 50 parts and 5 parts of rosin are suspended in 165 parts of water and 30 parts of diethylene glycol. Then 5 parts of 20% caustic soda solution and 7 parts of 28% ammonia are added and the agitated mixture heated to about 160° F. until the protein is dispersed. The resulting solution has a pH of 9.5. The alkalinity is then reduced by adding 10 parts of rosin dissolved in 30 parts of diacetone alcohol, while keeping the temperature at about 160° F. The pH is thus reduced to about 8.8. This is an ink base.

An ink is made by adding 20 parts of pulp blue to 25 parts of the above ink base and uniformly dispersing the pigment. The resulting ink dries rapidly in use, and when the printed ink is highly heated for a fraction of a minute, as in Example 6, the ink is bleed-proof, smudge-proof, and nondispersible.

Example 11

50 parts of corn protein from which substantially all the prolamine has been removed, 10 parts of rosin, 3.5 parts of caustic soda, and 185 parts of water, are heated to 185° F. The protein is quickly dispersed to a solution having a pH of about 10. More rosin may be added, as in the above examples, to reduce the pH. This makes an ink base, into which pigment may be incorporated to produce inks of the character above described.

Example 12

A volatile amine ink base is made by using:

| | Parts by weight |
|---|---|
| Full corn protein | 500 |
| Rosin | 50 |
| Water | 98 |
| Sodium peroxide | 3 |
| 20% solution NaOH | 70 |

The above are heated to 185° F., effecting a partial dispersion of the protein. Then add:

| | Parts |
|---|---|
| Rosin | 100 |
| Diethylene glycol | 300 |
| Morpholine | 50 | and again heat at 185° F. until the protein is completely dispersed. The solution has a pH of 8.5, and is an ink base.

An ink is made from said base by dissolving 12 parts of a water-soluble blue dye in 50 parts of water. The dye solution is added to 400 parts of the ink base, and thoroughly incorporated therein. The ink when printed on paper is non-smudging. When given a short heat-treatment as in Example 6, it produces a bleed-proof ink.

The invention is not limited to the use of caustic alkali to effect dispersion, as shown above. Non-caustic alkaline materials may be used, such as ammonium hydroxide, and amines, including alkyl amines, dodecylamines, and alkanolamines, and substituted ammonia compounds such as morpholine. These all will saponify the acids, such as rosin, or corn oil fatty acids, to form wetting agents which affect or aid the dispersion action, and improve the character of the ink.

Various modifications of the invention are contemplated as falling within the scope of the present invention as defined in the appended claims.

I claim:

1. A printing ink containing pigmentary particles in suspension in a fluid vehicle, said vehicle comprising alkaline-soap-dispersed corn protein in an aqueous medium, the corn protein being free from a history of dispersing contact with an alkaline aqueous solution having a pH over 11, and buffering material for an alkaline solution which acts as a wetting agent in alkaline solution, said material including water-soluble soap, and said vehicle having a pH not over 10.

2. A printing ink containing pigmentary particles in suspension in a fluid vehicle, said vehicle comprising alkaline-soap-dispersed corn protein in an aqueous medium, the corn protein being free from a history of dispersing contact with an alkaline aqueous solution having a pH over 11, and buffering material for an alkaline solution which acts as a wetting agent in alkaline solution, said material including water-soluble soap, and said vehicle having a pH not over 7.

3. A printing ink containing pigmentary particles in suspension in a fluid vehicle, said vehicle comprising alkaline-soap-dispersed corn protein in an aqueous medium, the corn protein being free from a history of dispersing contact with an alkaline aqueous solution having a pH over 11, and buffering material for an alkaline solution which acts as a wetting agent in alkaline solution, said material including water-soluble soap, and said vehicle having a pH from 7 to 10.

4. A printing ink containing pigmentary particles in suspension in a fluid vehicle, said vehicle comprising alkaline-soap-dispersed corn protein in an aqueous medium, the corn protein being free from a history of dispersing contact with an alkaline aqueous solution having a pH over 11, and a soap soluble in said medium whereby it acts as a buffer and a wetting agent, said vehicle having a pH not over 10.

5. A printing ink containing pigmentary particles in suspension in a fluid vehicle, said vehicle comprising alkaline-soap-dispersed corn protein in an aqueous medium, the corn protein being free from a history of dispersing contact with an alkaline aqueous solution having a pH over 11, and a rosin soap soluble in said medium whereby it acts as a buffer and a wetting agent, said vehicle having a pH not over 10.

6. A printing ink containing pigmentary particles in suspension in a fluid vehicle, said vehicle comprising alkaline-soap-dispersed corn protein in an aqueous medium, the corn protein being free from a history of dispersing contact with an alkaline aqueous solution having a pH over 11, and buffering material for an alkaline solution which acts as a wetting agent in alkaline solution, said material including water-soluble soap, and said vehicle including in addition to its aqueous ingredient at least one volatile organic liquid miscible with water and having a pH not over 10.

7. A printing ink containing pigmentary particles in suspension in a fluid vehicle, said vehicle comprising alkaline-soap-dispersed gluten-proteins of corn in an aqueous medium, the corn protein being free from a history of dispersing contact with an alkaline aqueous solution having a pH over 11, and buffering material for an alkaline solution which acts as a wetting agent in alkaline solution, said material including water-soluble soap, and said vehicle having a pH not over 10.

8. A printing ink containing pigmentary particles in suspension in a fluid vehicle, said vehicle comprising alkaline-soap-dispersed gluten-proteins of corn in an aqueous medium, the corn protein being free from a history of dispersing contact with an alkaline aqueous solution having a pH over 11, and a soap soluble in said medium whereby it acts as a buffer and a wetting agent, said vehicle having a pH not over 10.

9. A printing ink containing pigmentary particles in suspension in a fluid vehicle, said vehicle comprising alkaline-soap-dispersed gluten-proteins of corn in an aqueous medium, the corn protein being free from a history of dispersing contact with an alkaline aqueous solution having a pH over 11, and a rosin soap soluble in said medium whereby it acts as a buffer and a wetting agent, said vehicle having a pH not over 10.

10. A printing ink containing as its essential vehicle, a solution of zein in a solvent liquid having an organic liquid solvent component, said solution containing in dispersion therein a corn protein which is companion to said zein in corn gluten.

11. A printing ink containing as its essential vehicle, a solution of zein in a solvent liquid having an organic liquid solvent component, said solution containing in dispersion therein the protein content of the corn gluten from which gluten the said zein derived.

12. A printing ink containing as its essential vehicle, a solution of zein in a solvent liquid having an organic liquid solvent component, said solution containing in dispersion therein a corn protein which is companion to said zein in corn gluten, said dispersed protein being dyed to act as a pigmentary filler.

13. The method of making a printing ink base which comprises subjecting corn gluten to the action of a solvent for the zein content of the gluten, whereby to form a zein solution containing the companion protein content of said gluten in a dispersed form.

14. The method of making a printing ink base which comprises subjecting corn gluten to the action of a liquid printing-ink vehicle which is a volatile aqueous organic solvent for the zein content of the gluten in the presence of dispersing alkali in said solvent, whereby the zein is dissolved and the protein of the gluten associated with said gluten is dispersed by action of the alkali.

15. A printing ink base comprising a liquid vehicle and homogeneously distributed throughout said vehicle the proteins of corn gluten, said vehicle being volatile to the extent of leaving a solid residue of corn protein.

HARRY M. WEBER.